(12) United States Patent
Song et al.

(10) Patent No.: US 9,147,237 B2
(45) Date of Patent: Sep. 29, 2015

(54) IMAGE PROCESSING METHOD AND DEVICE FOR ENHANCING IMAGE QUALITY USING DIFFERENT COEFFICIENTS ACCORDING TO REGIONS

(71) Applicant: SAMSUNG ELECTRONICS CO., LTD., Suwon-si, Gyeonggi-do (KR)

(72) Inventors: Min Woo Song, Hwaseong-si (KR); Je Woo Moon, Hwaseong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/070,987

(22) Filed: Nov. 4, 2013

(65) Prior Publication Data

US 2014/0140632 A1    May 22, 2014

(30) Foreign Application Priority Data

Nov. 16, 2012 (KR) .................. 10-2012-0130118

(51) Int. Cl.
*G06K 9/40* (2006.01)
*G06T 5/20* (2006.01)
*G06T 5/00* (2006.01)

(52) U.S. Cl.
CPC ... *G06T 5/20* (2013.01); *G06T 5/00* (2013.01); *G06T 2207/20012* (2013.01); *G06T 2207/20104* (2013.01)

(58) Field of Classification Search
CPC ......... G06T 3/20; G06T 3/4007; G06T 3/403; G06T 3/4025; G06T 3/4053; G06T 3/4845; G06T 5/20; G06T 5/50; G06T 7/0026; G06T 13/80; G06T 19/00; G06T 2207/20016; G06T 2007/20021; G06T 2207/20208; H04N 5/2355; H04N 7/104; H04N 7/125; H04N 7/127; H04N 7/141; H04N 7/147; H04N 7/15; H04N 13/0429; H04N 13/0438; H04N 13/0497; H04N 21/4307; H04N 21/4316; H04N 21/44004; G06F 3/0481; G06F 3/0484; G06F 3/04842; G06F 3/0488; G06F 3/1423; G06F 3/1454; G06F 17/30256; G06F 17/3028; G06F 2203/4803; G06F 2203/04804; G06F 2203/04806; G09G 5/14; G09G 5/393; G09G 5/395; G09G 2340/04; G09G 2340/0407; G09G 2340/0442; G09G 2340/125; G09G 2340/145; G09G 2354/00; G09G 2370/16; G09G 2370/20

See application file for complete search history.

(56) References Cited

U.S. PATENT DOCUMENTS

| 6,714,692 B1 | 3/2004 | Kim et al. |
| 7,149,369 B2 | 12/2006 | Atkins |
| 7,995,146 B2 | 8/2011 | Tomonaga |

(Continued)

FOREIGN PATENT DOCUMENTS

| JP | 2007-193397 | 8/2007 |
| JP | 2008-123156 | 5/2008 |
| JP | 2010-245967 | 10/2010 |

(Continued)

*Primary Examiner* — Jose Couso
(74) *Attorney, Agent, or Firm* — F. Chau & Associates, LLC

(57) ABSTRACT

An image processing device includes a region detector configured to receive input image data and to determine a region in which the input image data belongs to among a plurality of regions; and an operation unit configured to perform an operation on the input image data using a coefficient corresponding to the determined region among a plurality of different coefficients, which are predetermined to respectively correspond to the plurality of regions.

19 Claims, 16 Drawing Sheets

(56) References Cited

U.S. PATENT DOCUMENTS

| | | | |
|---|---|---|---|
| 8,502,856 B2* | 8/2013 | Cranfill et al. | 348/14.02 |
| 8,803,908 B2* | 8/2014 | Van Osten et al. | 345/619 |
| 2008/0031538 A1 | 2/2008 | Jiang et al. | |
| 2008/0309817 A1 | 12/2008 | Huang et al. | |
| 2014/0192090 A1* | 7/2014 | Park | 345/672 |

FOREIGN PATENT DOCUMENTS

| | | |
|---|---|---|
| KR | 1020090032807 | 4/2009 |
| KR | 1020100132334 | 12/2010 |

* cited by examiner

FIG. 3A

| ROI | ROI Coordinates |
|-----|-----------------|
| 1   | RC1             |
| 2   | RC2             |
| ⋮   | ⋮               |
| n   | RCn             |

FIG. 3B

| ROI | Coeff. |
|-----|--------|
| 1 | C1 |
| 2 | C2 |
| ⋮ | ⋮ |
| n | Cn |

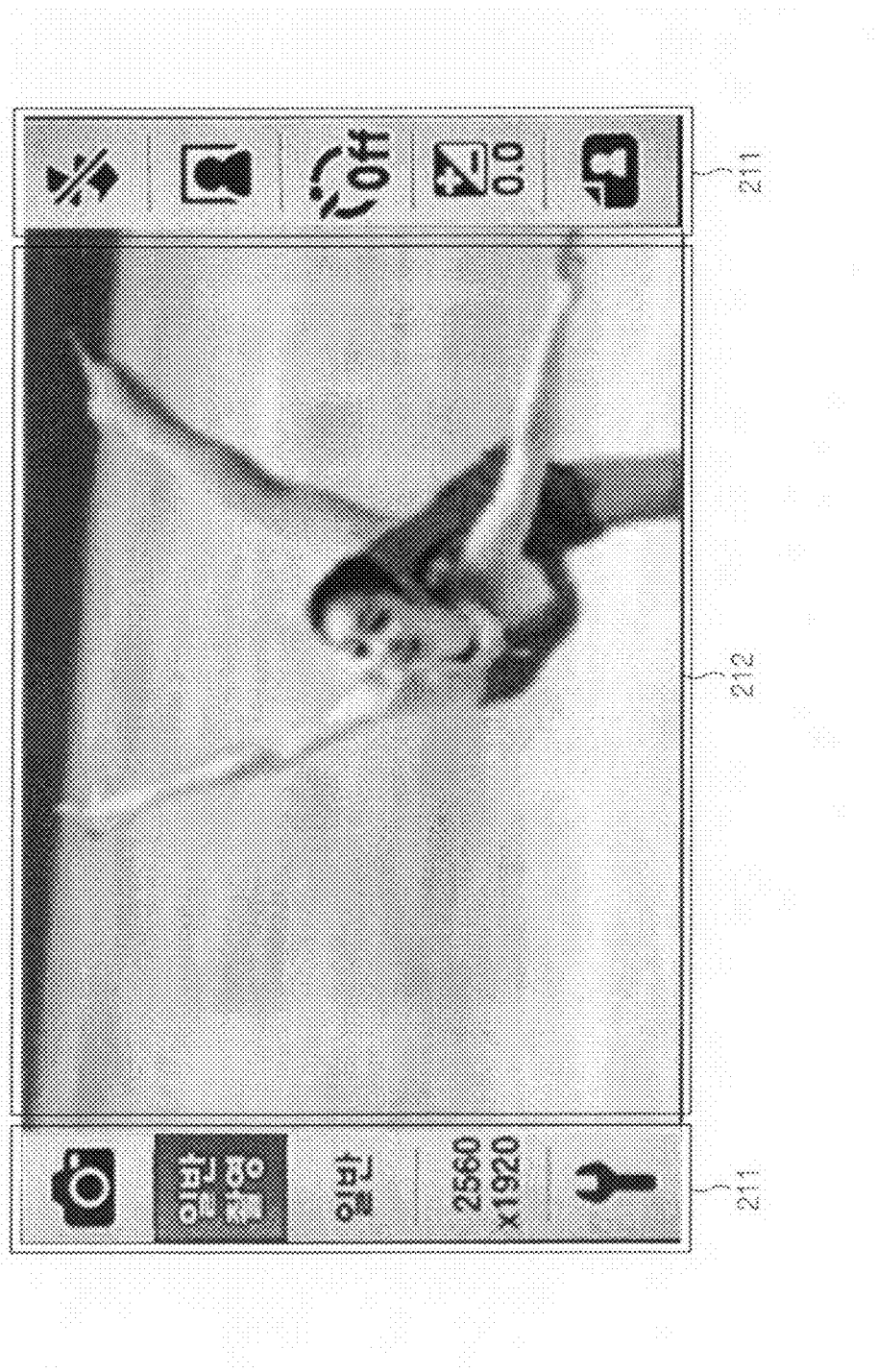

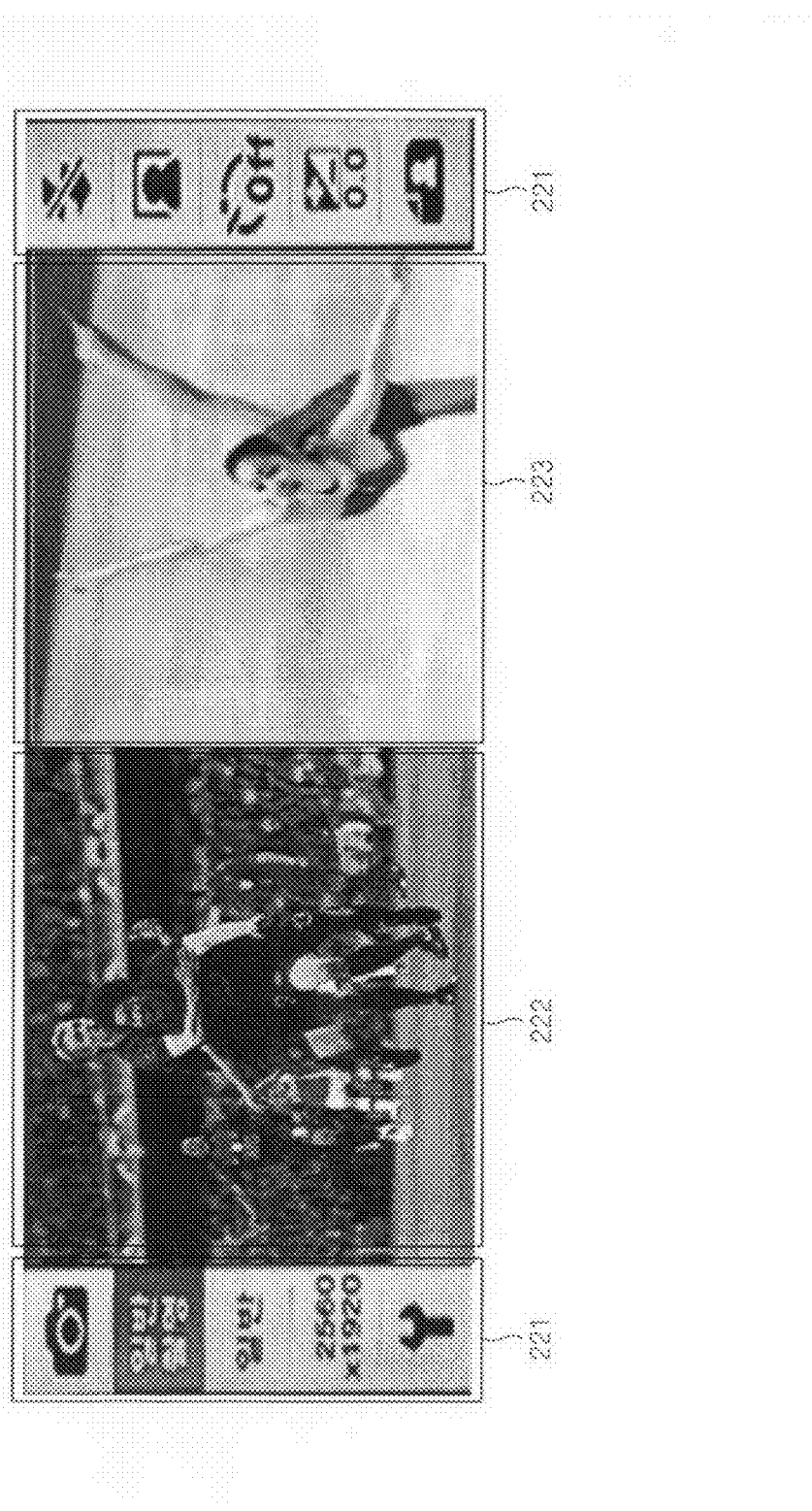

IMAGE PROCESSING METHOD AND DEVICE FOR ENHANCING IMAGE QUALITY USING DIFFERENT COEFFICIENTS ACCORDING TO REGIONS

CROSS-REFERENCE TO RELATED APPLICATIONS

This application claims priority under 35 U.S.C. §119(a) to Korean Patent Application No. 10-2012-0130118 filed on Nov. 16, 2012, the disclosure of which is incorporated by reference in its entirety herein.

BACKGROUND

1. Technical Field

Embodiments of the inventive concept relate to an image processing method, and more particularly, to an image processing method and device for enhancing image quality when at least two images are displayed on a single screen.

2. Discussion of Related Art

The screen size of a display device for a mobile device may be quite large. In addition, there has been increasing demand for the display device of a mobile device to display images with very high image quality.

Thus, the screen of a mobile device may be divided into at least two regions to display different images on one screen. For example, a user interface image may be displayed in one of the regions and a video image may be displayed in another one of the regions. However, image quality of the screen may be poor when these two separate images are displayed together in their respective regions.

SUMMARY

According to an exemplary embodiment of the inventive concept, an image processing device including a region detector configured to receive input image data and to determine a region which the input image data belongs to among a plurality of regions; and an operation unit configured to perform an operation on the input image data using a coefficient corresponding to the determined region among a plurality of different coefficients, which are predetermined to respectively correspond to the plurality of regions.

According to an exemplary embodiment of the invention concept, the image processing device includes a processor configured to receive the input image data, determine a region which the input image data belongs to among a plurality of regions, select a coefficient among a plurality of different coefficients that corresponds to the determined region, and perform an operation on the input image data using the selected coefficient.

The image processing device may further include a coordinates generator configured to generate input image coordinates of the input image data. The region detector may compare the input image coordinates with predetermined region coordinates and determine the region for the input image data.

In an exemplary embodiment, the processor generates the input image coordinates from the input image data and determines the region by comparing the input image coordinates with the predetermined region coordinates.

The region coordinates may define the plurality of regions. The plurality of coefficients may have different values, respectively, and correspond to the plurality of regions, respectively.

The image processing device may further include a coordinates storage unit configured to store the region coordinates and a coefficient storage unit configured to store the plurality of coefficients.

In an exemplary embodiment, the image processing device includes one or more memories that store the region coordinates and the coefficients.

According to an embodiment of the inventive concept, an image processing method including setting region coordinates defining a plurality of regions and a plurality of coefficients respectively corresponding to the plurality of regions, receiving input image data and determining a region which the input image data belongs to among the plurality of regions, and performing an operation on the input image data using a coefficient corresponding to the determined region among the plurality of coefficients.

The image processing method may further include generating input image coordinates of the input image data before the determining the region. The determining the region may include comparing the input image coordinates with the region coordinates and determining the region for the input image data.

The performing the operation may include changing a size of the input image data using the coefficient corresponding to the determined region.

Alternatively, the performing the operation may include at least one of interpolating the input image data using the coefficient corresponding to the determined region, enhancing color of the input image data using the coefficient corresponding to the determined region, and enhancing a sharpness property of the input image data using the coefficient corresponding to the determined region.

According to an exemplary embodiment of the inventive concept, an image processing method includes setting region coordinates defining a plurality of regions on a display and a plurality coefficients respectively corresponding to the plurality of regions, determining which one of the regions input image data belongs to, determining which one of the coefficients corresponds to the determined one region, and performing an operation on the input image data using the determined coefficient.

According to an exemplary embodiment of the inventive concept, an image processing method including setting a plurality of sets of region coordinates and coefficients for a plurality of image processing modes, respectively; selecting one of the plurality of image processing modes according to a user's menu selection; selecting a set of region coordinates and coefficients corresponding to the selected image processing mode among the plurality of sets where the set of region coordinates and coefficients includes a plurality of coefficients respectively corresponding to a plurality of regions; receiving input image data and determining a region which the input image data belongs to among the plurality of regions; and performing an operation on the input image data using a coefficient corresponding to the determined region among the plurality of coefficients in the selected set of region coordinates and coefficients.

According to an exemplary embodiment of the inventive concept, a method of managing display of images on a display including first and second distinct regions includes: determining a coordinate from input image data; determining whether the coordinate is located within first boundary coordinates or second boundary coordinates, where the first boundary coordinates are associated with a first coefficient and the second boundary coordinates are associated with a second coefficient; selecting the first coefficient and the first region when the coordinate is determined to be located within the first boundary coordinates and otherwise selecting the second coefficient; performing an image operation on the input image data using the selected coefficient; and outputting a result of the operation to the selected region of the display.

BRIEF DESCRIPTION OF THE DRAWINGS

The inventive concept will become more apparent by describing in detail exemplary embodiments thereof with reference to the attached drawings in which:

FIG. 3A is a table showing ROI coordinates stored in an ROI coordinates storage unit illustrated in FIG. 1 according to an exemplary embodiment of the inventive concept;

FIG. 3B is a table showing coefficients stored in a coefficient storage unit illustrated in FIG. 1 according to an exemplary embodiment of the inventive concept;

FIGS. 4A through 4E show different examples of a screen including at least two ROIs;

DETAILED DESCRIPTION

Figure 1:
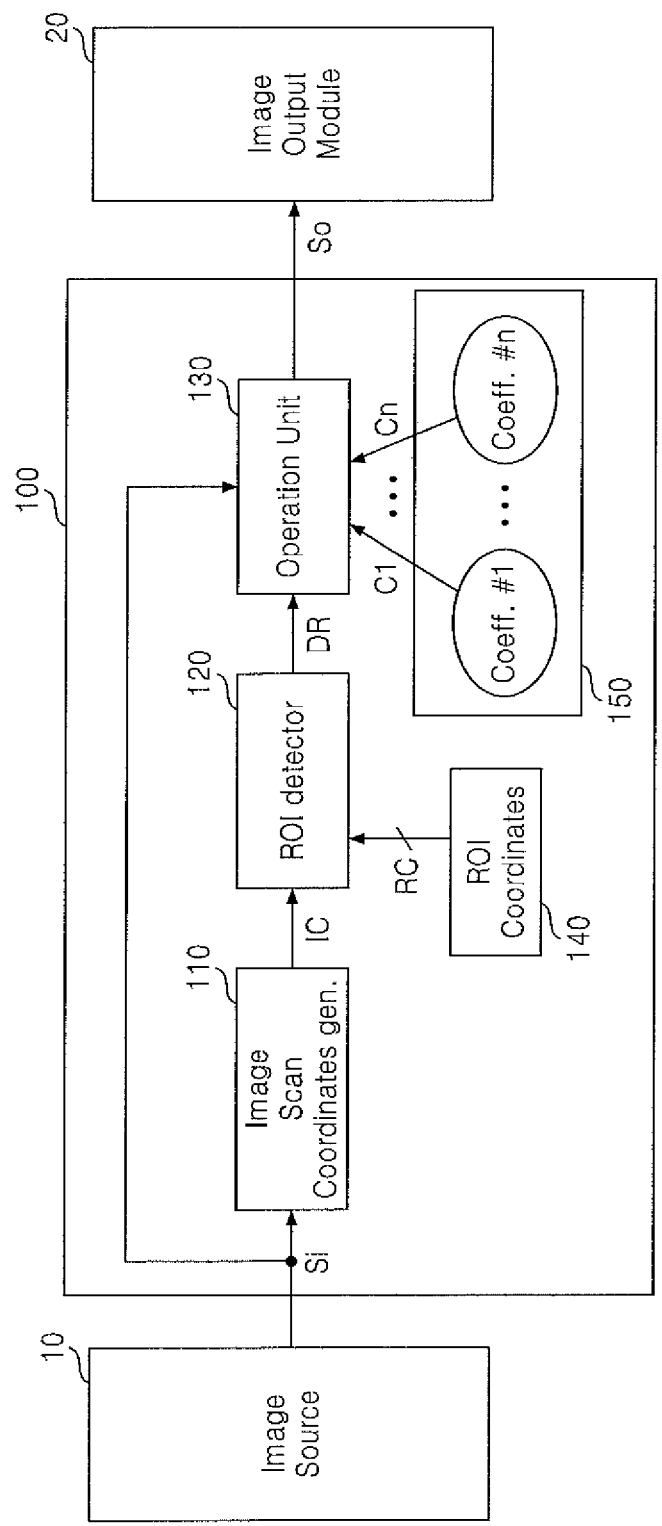
FIG. 1 is a schematic block diagram of an image processing device according to an exemplary embodiment of the inventive concept.

The inventive concept now will be described more fully hereinafter with reference to the accompanying drawings, in which exemplary embodiments of the inventive concept are shown. This invention may, however, be embodied in many different forms and should not be construed as limited to the exemplary embodiments set forth herein. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. As used herein, the singular forms "a", "an" and "the" are intended to include the plural forms as well, unless the context clearly indicates otherwise.

Figure 2:
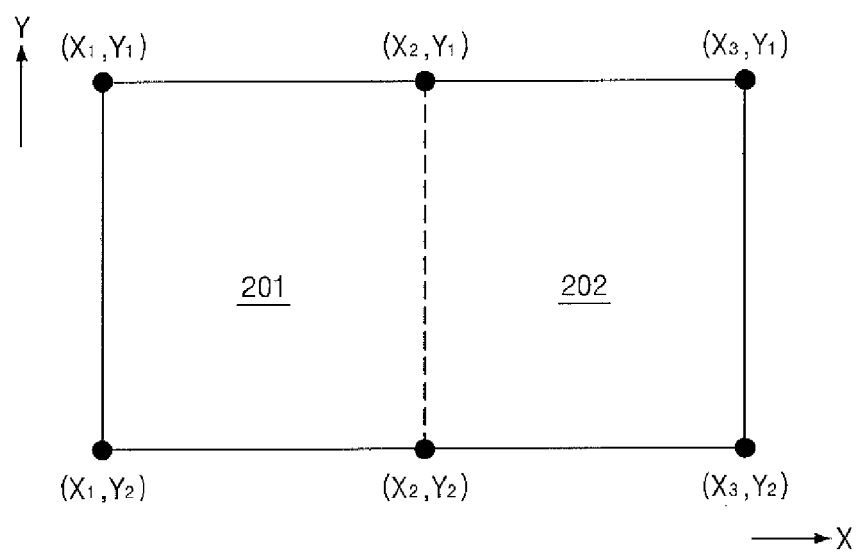
FIG. 2 is a conceptual diagram of a screen divided into at least two regions of interests (ROIs) according to an exemplary embodiment of the inventive concept.

FIG. 1 is a schematic block diagram of an image processing device 100 according to an exemplary embodiment of the inventive concept. FIG. 2 is a conceptual diagram of a screen divided into at least two regions of interests (ROIs) according to an exemplary embodiment of the inventive concept. Referring to FIGS. 1 and 2, the image processing device 100 includes a coordinates generator 110, a ROI detector 120, an operation unit 130, a ROI coordinates storage unit 140, and a coefficient storage unit 150.

In an exemplary embodiment the image processing device 100 includes a processor, a memory, the memory stores a computer program with instructions, and the instructions perform all the functions of the coordinates generator 110, the ROI detector 120, and the operation unit 130. The data stored by the ROI coordinates storage unit 140 and the coefficient storage unit 150 may be stored in the program, loaded from one or more local memories, or from an external source (e.g., external memory, external host, etc.) into the program. In an exemplary embodiment, each of the coordinates generator 110, the ROI detector 120, and the operation unit 130 are processors or logic, respectively. In an exemplary embodiment, the logic is a field programmable gate array. In an exemplary embodiment, the image processing device 100 is a system on chip (SoC) or a processor, which performs all the functions of the coordinates generator 110, the ROI detector 120, and the operation unit 130, and include a memory to store the data of the ROI coordinates storage unit 140 and the coefficient storage unit 150.

The coordinates generator 110 receives input image data Si from an image source 10 and generates input image coordinates IC. For instance, the coordinates generator 110 may sequentially receive pixel data in the input image data Si and generate the coordinates IC corresponding to the pixel data. The coordinates may indicate the location on the screen in which the pixel data is displayed.

The image source 10 may be a module that generates, stores, or outputs the input image data Si. For instance, the image source 10 may be a camera module generating the input image data Si, a memory storing the input image data Si, or a network device transmitting the input image data Si, but the inventive concept is not restricted to this example. Although only one image source 10 is illustrated in FIG. 1, two or more image sources may be provided and a module (not shown) combining image data respectively received from the image sources may be further provided.

The ROI detector 120 compares the input image coordinates IC with predetermined ROI coordinates RC and determines a ROI which the input image coordinates IC belong to among at least two ROIs. For example, the ROI coordinates RC may indicate the boundaries of each of the ROIs and pixel data having input image coordinates IC located within one of these boundaries is presented in the corresponding ROI on the screen.

Although a screen 200 of an image output module 20 is divided into two ROIs 201 and 202 in the embodiment illustrated in FIG. 2, the inventive concept is not restricted to this embodiment. For example, the screen 200 may include more than two ROIs. Although the screen 200 of the image output module 20 has ROIs in a horizontal row in the embodiment illustrated in FIG. 2, the invention concept is not restricted to this embodiment. For example, the screen may arrange the ROIs in a vertical column or may arrange the ROIs in a combination of rows and columns. Further, the ROIs need not be arranged in rows or columns and space may be present between ROIs. Although the screen 200 of the image output module 20 has square or rectangular shaped ROIs in the embodiment illustrated in FIG. 2, the inventive concept is not limited thereto. For example, the ROIs can be any shape, such as a circle, a trapezoid, an ellipse, etc. The image output module 20 may be a display device (e.g., a liquid crystal display (LCD) device).

The screen 200 of the image output module 20 may be divided into "n" ROIs, e.g., first through n-th ROIs, where "n"

is 2 or a natural number greater than 2. The ROI coordinates storage unit 140 stores ROI coordinates defining the first through n-th ROIs. For example, the ROI coordinates storage unit 140 may store boundary coordinates of each ROI.

Figure 3A:
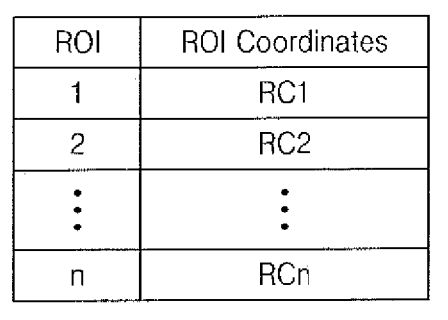

As shown in FIG. 3A, coordinates (hereinafter, referred to as first ROI coordinates RC1) defining the first ROI, coordinates (hereinafter, referred to as second ROI coordinates RC2) defining the second ROI, and coordinates (hereinafter, referred to as n-th ROI coordinates RCn) defining the n-th ROI may be stored in the ROI coordinates storage unit 140. The ROI coordinates storage unit 140 may be implemented by a register or a memory, but the inventive concept is not restricted thereto.

In the embodiments illustrated in FIG. 2, the first ROI coordinates RC1 corresponding to the first ROI 201 includes coordinates $(X_1, Y_1)$, $(X_2, Y_1)$, $(X_1, Y_2)$, and $(X_2, Y_2)$; and the second ROI coordinates RC2 corresponding to the second ROI 202 includes coordinates $(X_2, Y_1)$, $(X_3, Y_1)$, $(X_2, Y_2)$, and $(X_3, Y_2)$. These first and second ROI coordinates RC1 and RC2 may be stored in advance in the ROI coordinates storage unit 140 in a table form as shown in FIG. 3A.

The ROI detector 120 compares the input image coordinates IC with the first and second ROI coordinates RC1 and RC2 and determines a ROI in which the input image coordinates IC belong to among the at least two ROIs. For example, the ROI detector 120 determines a ROI in which the input image data Si corresponding to the input image coordinates IC belongs to among a plurality of ROIs using the input image coordinates IC and ROI coordinates RC.

The operation unit 130 performs an operation on the input image data Si using a coefficient Coeff corresponding to the determined ROI. The coefficient Coeff may be stored in the coefficient storage unit 150. In an exemplary embodiment, the operation unit 130 performs a scaling operation changing the data size of an input image, an operation of interpolating the input image, an operation of enhancing or compensating for the color of the input image, or an operation of enhancing the sharpness or blur of the input image. The function of the operation unit 130 will be described additionally with reference to FIGS. 7a and 7b below. The operation unit 130 may be implemented in hardware, but the inventive concept is not restricted thereto.

The ROI coordinates RC and the coefficients Coeff may be set by a user. For instance, the ROI coordinates RC and the coefficients Coeff may be programmably stored.

According to an exemplary embodiment of the inventive concept, different coefficients are applied to different regions using a single operation unit without requiring separate operation units for the different regions, so that the quality of an image having a plurality of regions may be enhanced.

Figure 3B:
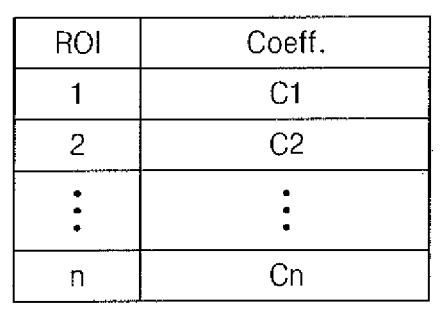

As shown in FIG. 3B, the coefficient storage unit 150 may store first through n-th coefficients C1 through Cn respectively corresponding to the first through n-th ROIs.

When the input image coordinates IC of the input image data Si belong to the first ROI, the operation unit 130 extracts the first coefficient C1 from the coefficient storage unit 150 and processes the input image data Si using the first coefficient C1. When the input image coordinates IC of the input image data Si belong to the second ROI, the operation unit 130 extracts the second coefficient C2 from the coefficient storage unit 150 and processes the input image data Si using the second coefficient C2. Each of the first through n-th coefficients C1 through Cn may be composed of one or more coefficient(s) or subcoefficient(s). For example, a first one of the coefficients (e.g., C1) could include a first subcoefficient indicating an interpolation technique and a second subcoefficient indicating a resolution for scaling. In this example, if the first coefficient is loaded based on the coordinates of the input image data being located within a first ROI, the operation unit 130 would perform both interpolation according to the first subcoefficient and scaling according to the second subcoefficient.

As described above, different coefficients are used to process images of different image quality for each of the ROIs in a screen in an embodiment of the inventive concept. For this operation, the coordinates generator 110 is provided to track the position (e.g., coordinates) of the input image data Si to be processed. In addition, the ROI detector 120 is provided to detect a ROI corresponding to the input image data Si to be processed, to select a coefficient corresponding to the detected ROI, and to process the input image data Si using the selected coefficient.

An output image So resulting from the processing by the operation unit 130 is transmitted to the image output module 20 and is displayed on a screen. Alternatively, the output image So may be transmitted to another image processing module (not shown) and used as an input for another image processing.

The coefficient storage unit 150 may implemented by a register or a mapping table.

Figure 4D:

FIGS. 4A through 4F show different examples of a screen including at least two regions. FIG. 4A shows an example in which two images are displayed on a single screen. In other words, one screen is divided into two regions. Referring to FIG. 4A, a first region 211 is a region where user interface (UI) graphics are displayed and a second region 212 is a region where a video image is displayed.

Two images, e.g., a video image and a UI graphic image may be respectively input from different image sources. Alternatively, the two images may be combined before being input to an image processing device (e.g., 100 in FIG. 1). When different image quality processing is used with respect to different images, e.g., a video image and a UI graphic image, the result image may have better quality.

As shown in FIG. 4A, when the video image and the UI graphic image are displayed on one screen, a property of the video image is different from that of the UI graphic image. Image quality can be enhanced by using different coefficients considering the different properties.

For instance, an image may be processed using a coefficient having a sharpness property for the first region, e.g., a UI graphic region 211 while an image is processed using a coefficient having a blur property for the second region, e.g., a video region 212. As a result, an output image has enhanced quality as compared to an image output using conventional single image processing.

FIG. 4B shows an example in which three images are displayed on a single screen. In other words, one screen is divided into three regions. Referring to FIG. 4B, a first region 221 is a region where UI graphics are displayed and second and third regions 222 and 223 are regions where different video images are respectively displayed.

Different coefficients respectively corresponding to the first through third regions 221, 222, and 223 may be stored in advance and a different coefficient is applied to the input image data Si belonging to each of the regions 221 through 223 during image processing. In an exemplary embodiment, a coefficient is a scaling coefficient, a coefficient for sharpness/blur processing, a coefficient for color enhancement, or an interpolation coefficient, but the inventive concept is not restricted to these examples.

In an exemplary embodiment, image interpolation attempts to achieve a best approximation of a pixel's color and intensity based on the values at surrounding pixels. Each interpolation coefficient may represent a different interpolation algorithm. Interpolation algorithms may be divided into adaptive and non-adaptive interpolation methods. Non-adaptive interpolation methods may include nearest neighbor, bilinear, bicubic, spline, sine, lanczos, etc. Adaptive interpolation methods may include Oimage, PhotoZoom Pro, Genuine Fractals, etc.

Figure 4E:
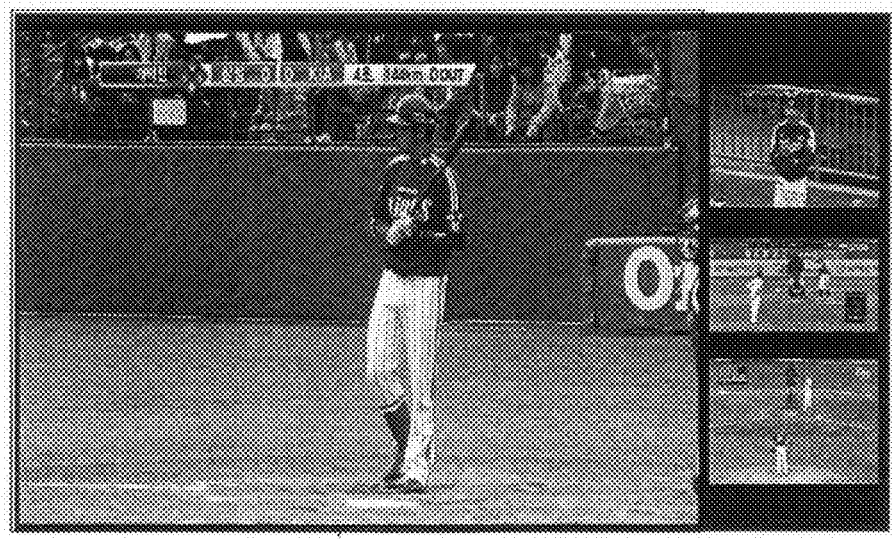

FIG. 4C shows an example in which a screen is divided into six regions 231 through 236. FIG. 4D shows another example in which a screen is divided into two regions 241 and 242. FIG. 4E shows an example in which four images are displayed on one screen, that is, one screen is divided into four regions 261 through 264.

As described above, when one screen is divided into at least two regions, different coefficients corresponding to the respective regions are stored in advance and a different coefficient is used for image data belonging to each of the regions during image processing, so that image quality can be enhanced.

Figure 5:
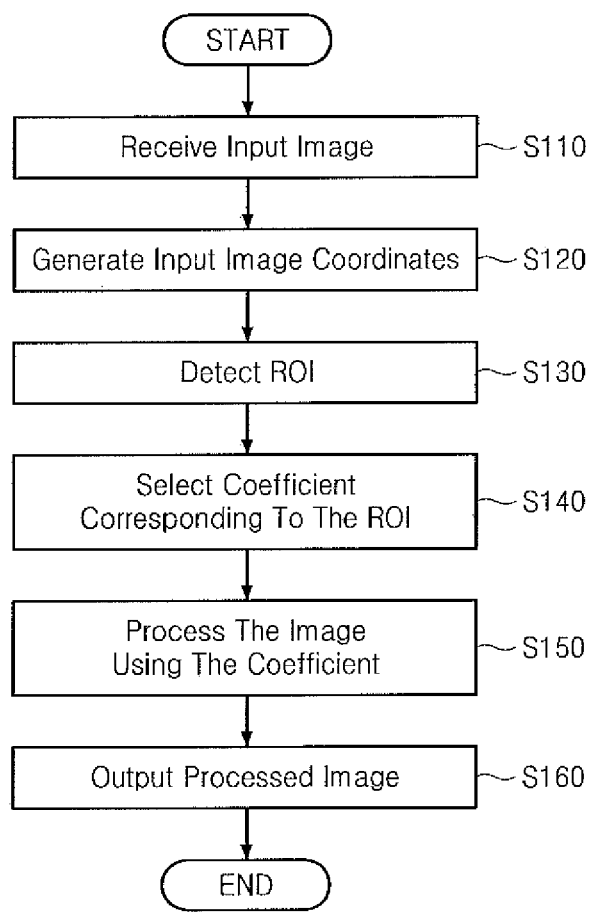
FIG. 5 is a flowchart of an image processing method according to an exemplary embodiment of the inventive concept.

FIG. 5 is a flowchart of an image processing method according to an exemplary embodiment of the inventive concept. The image processing method may be performed by the image processing device 100 illustrated in FIG. 1. Referring to FIGS. 1 and 5, the image processing device 100 receives the input image data Si (S110). The input image data Si may include pixel data of a plurality of pixels (e.g., M*N pixels where M and N are natural numbers) forming a frame image. In an exemplary embodiment, frames of the pixel data are sequentially input to the image processing device 100 and a ROI in which each of the pixel data belongs to among a plurality of ROIs is determined. As an example, some of the M*N pixels of a given frame belong to a first ROI among the plurality of ROIs and some of the M*N pixels of the same frame belong to a second ROI.

The coordinates generator 110 generates the input image coordinates IC corresponding to each pixel datum to determine the ROI in which each part of the pixel data belongs to among at least two ROIs (S120).

Then, the ROI detector 120 compares the input image coordinates IC generated in operation S120 with the predetermined ROI coordinates RC to determine the ROI in which the input image coordinates IC belong to among the at least two ROIs (S130). However, a method of detecting a ROI is not restricted thereto. For instance, when the source of an image is different according to a ROI, which ROI an input pixel datum belongs to may be determined without generating coordinates for the pixel datum. For example, all pixel data received from a first source could be assumed to be part of one ROI and all pixel data received from a second source could be assumed to be part of a second ROI.

The operation unit 130 selects and extracts a coefficient corresponding to the ROI determined in operation S130 from the ROI coordinates storage unit 140 (S140), processes the pixel datum using the selected coefficient (S150), and outputs the processed image, e.g., the output image So (S160).

Figure 6:
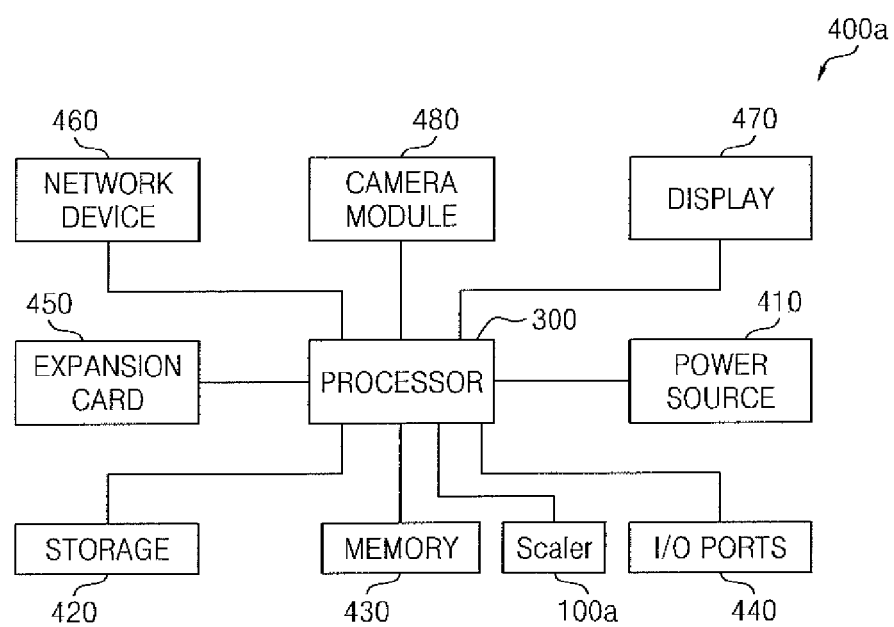
FIG. 6 is a block diagram of an electronic system according to an exemplary embodiment of the inventive concept.

FIG. 6 is a block diagram of an electronic system 400a according to an exemplary embodiment of the inventive concept. The electronic system 400a may be implemented as a personal computer (PC), a data server, a portable device, etc. The portable device may be a mobile telephone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, an e-book, etc.

The electronic system 400a may include a processor 300, a power source 410, a storage 420, a memory 430, input/output (I/O) ports 440, an expansion card 450, a network device 460, a display 470, a camera module 480, and a scaler 100a.

The processor 300 controls the operation of at least one of the elements 410 through 480 and 100a. The processor 300 may be implemented as a system on chip (SoC).

The scaler 100a is an example of the image processing device 100 illustrated in FIG. 1 and may be implemented separately from the processor 300, an image signal processor (ISP) (not shown), etc. In an embodiment, the scaler 100a is a processor.

The power source 410 supplies an operating voltage to at least one of the elements 300, 420 through 480, and 100a. The storage 420 may be implemented by a hard disk drive (HDD) or a solid state drive (SSD).

The memory 430 may be implemented by a volatile or non-volatile memory. The memory 430 may be used as the ROI coordinates storage unit 140 or the coefficient storage unit 150 illustrated in FIG. 1.

The I/O ports 440 receive data transmitted to the electronic system 400a or transmit data from the electronic system 400a to an external device. For instance, the I/O ports 440 may be a port for connecting with a pointing device such as a computer mouse, a port for connecting with a printer, or a port for connecting with a universal serial bus (USB) drive.

The expansion card 450 may be implemented as a secure digital (SD) card or a multimedia card (MMC). The expansion card 450 may be a subscriber identity module (SIM) card or a universal SIM (USIM) card.

The network device 460 enables the electronic system 400a to connect with a wired or wireless network. The display 470 displays data output from the storage 420, the memory 430, the I/O ports 440, the expansion card 450, or the network device 460.

The camera module 480 is a module that can convert an optical image into an electrical image. Accordingly, the electrical image output from the camera module 480 may be stored in the storage 420, the memory 430, or the expansion card 450.

Figure 7A:
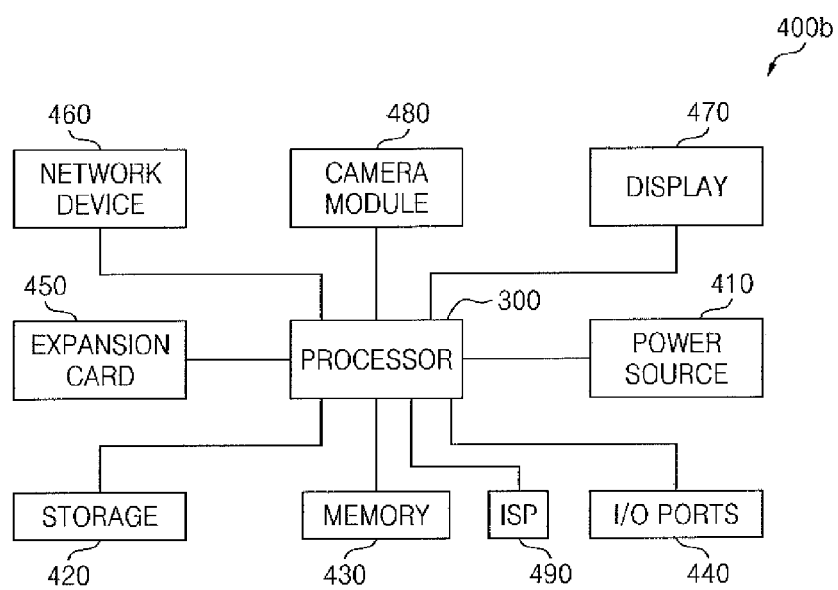
FIG. 7A is block diagram of an electronic system according to an exemplary embodiment of the inventive concept.

FIG. 7A is block diagram of an electronic system 400b according to an exemplary embodiment of the inventive concept. The electronic system 400b illustrated in FIG. 7A is similar to the electronic system 400a illustrated in FIG. 6. Thus, differences between the two systems 400a and 400b will be mainly described.

While the scaler 100a is implemented as a module separate from the processor 300 and the ISP in the electronic system 400a illustrated in FIG. 6, a scaler (100b in FIG. 7B) is implemented in an ISP 490 in the electronic system 400b illustrated in FIG. 7A.

The ISP 490 is a module processing image signals. The ISP 490 may be integrated into a single SoC together with the processor 300 or may be implemented in a chip or module separate from the processor 300. The ISP 490 may process images captured by the camera module 480.

Figure 7B:
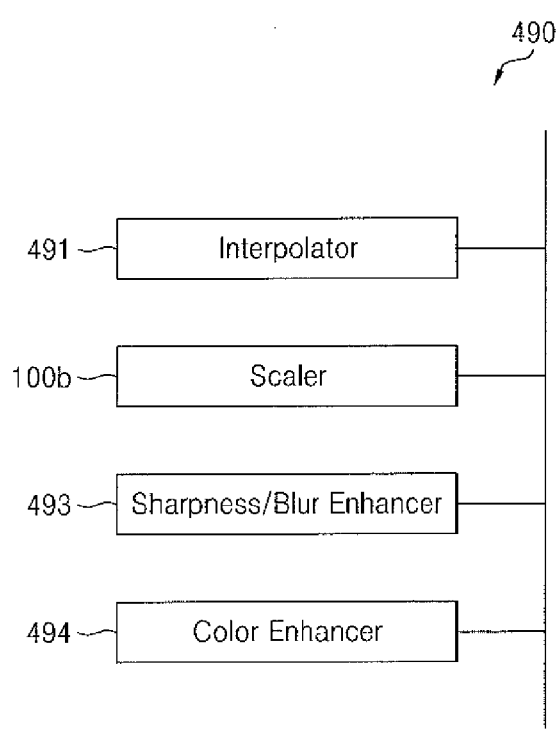
FIG. 7B is a schematic functional block diagram of an image signal processor (ISP) illustrated in FIG. 7A according to an exemplary embodiment of the inventive concept.

FIG. 7B is a schematic functional block diagram of the ISP 490 illustrated in FIG. 7A according to an exemplary embodiment of the inventive concept. The ISP 490 may include an interpolator 491, the scaler 100b, a sharpness/bur enhancer 493, and a color enhancer 494.

The interpolator 491 may be used to create more image signals (e.g., pixel data) than input image signals. In an exemplary embodiment, the image processing device 100 illustrated in FIG. 1 is applied to the interpolator 491. In this embodiment, the operation unit 130 illustrated in FIG. 1 is implemented as an interpolation filter and a coefficient of the interpolation filter is set differently according to a ROI.

The scaler 100*b* is a module changing the size of an image. The scaler 100*b* may be used to adjust a source image to the resolution of a display device. The scaler 100*b* may be used to adjust one ROI of a screen to one resolution and another ROI of the same screen to a second other resolution. In an exemplary embodiment, the image processing device 100 illustrated in FIG. 1 is applied to the scaler 100*b*. In this embodiment, the operation unit 130 illustrated in FIG. 1 is implemented as a scaling filter and a coefficient of the scaling filter is set differently according to a ROI. The scaling filter may be implemented by a poly-phase filter, but the inventive concept is not restricted thereto. In an exemplary embodiment, the scaler 100*b* is a processor.

The sharpness/blur enhancer 493 is an image processing module that enhances the sharpness or blur of an image. In an exemplary embodiment, the image processing device 100 illustrated in FIG. 1 is applied to the sharpness/blur enhancer 493. In this embodiment, the operation unit 130 illustrated in FIG. 1 uses a different sharpness or blur coefficient according to a ROI when processing the input image data Si.

The color enhancer 494 is an image processing module that changes, enhances, or compensates for the color of an image. In an exemplary embodiment, the image processing device 100 illustrated in FIG. 1 is applied to the color enhancer 494. In this embodiment, the operation unit 130 illustrated in FIG. 1 uses a different color enhancement coefficient according to a ROI when processing the input image data Si.

Figure 8A:
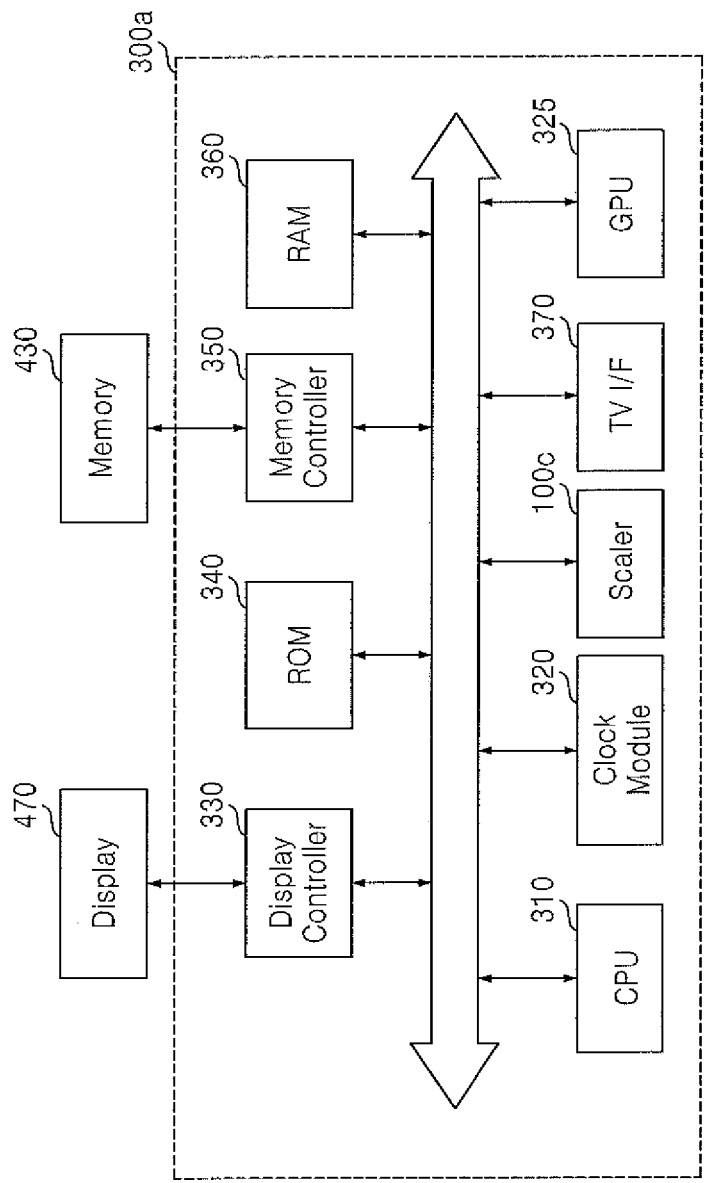
FIG. 8A is a block diagram of an example of a processor illustrated in FIG. 6 according to an exemplary embodiment of the inventive concept.

FIG. 8A is a block diagram of an example 300*a* of the processor 300 illustrated in FIG. 6 according to an exemplary embodiment of the inventive concept. The processor 300*a* includes a central processing unit (CPU) 310, a clock module 320, graphics processing unit (GPU) 325, a display controller 330, a read-only memory (ROM) 340, a memory controller 350, a random access memory (RAM) 360, a television interface (TV I/F) 370, a scaler 100*c*, and a bus. However, the structure of the processor 300 is not restricted to the example 300*a* illustrated in FIG. 8A, as some elements may be omitted or added.

The CPU 310 may process or execute programs and/or data stored in the memory 340, 360, or 430. For instance, the CPU 310 may process or execute the programs and/or the data in response to an operating clock signal output from the clock module 320.

The CPU 310 may be implemented by a multi-core processor. The multi-core processor is a single computing component with two or more independent actual processors (referred to as cores). Each of the processors may read and execute program instructions. The multi-core processor can drive a plurality of accelerators at a time, and therefore, a data processing system including the multi-core processor may perform multi-acceleration.

The GPU 325 may reduce the load of the CPU 310 and may read and execute program instructions related to graphics processing. The GPU 325 receives data from the memory 430 through the memory controller 350 or transmits data processed by the GPU 325 to the memory 430. The GPU 325 may process or execute the programs and/or data in response to an operating clock signal output from the clock module 320.

The scaler 100*c* is an example of the image processing device 100 illustrated in FIG. 1. It may be implemented in the processor 300*a*.

Programs and/or data stored in the memory 430 may be loaded to a memory within the CPU 310 or the GPU 325 when necessary. The ROM 340 may store permanent programs and/or data. The ROM 340 may be implemented by an erasable programmable ROM (EPROM) or an electrically EPROM (EEPROM).

The RAM 360 may temporarily store programs, data, or instructions. The programs and/or data stored in the memory 430 may be temporarily stored in the RAM 360 according to the control of the CPU 310 or a booting code stored in the ROM 340. The RAM 360 may be implemented by dynamic RAM (DRAM) or a static RAM (SRAM).

The memory controller 350 is used to interface with the memory 430. The memory controller 350 controls the overall operation of the memory 430 and controls the data communication between a host and the memory 430. The memory controller 350 may control the memory 430 to write or read data at the request of the host. The host may be a master device such as the CPU 310, the GPU 325, or the display controller 330.

The memory 430 is a storage medium for storing data and may store an operating system (OS) and various kinds of programs and data. The memory 430 may be implemented by DRAM, but the inventive concept is not restricted thereto. The memory 430 may be implemented by non-volatile memory such as flash memory, phase-change RAM (PRAM), magnetoresistive RAM (MRAM), resistive RAM (ReRAM) or ferroelectric RAM (FeRAM). In an exemplary embodiment, the memory 430 is embedded in the processor 300*a*.

At least one of the memories 340, 360, and 430 illustrated in FIGS. 6 through 8A may be used as the ROI coordinates storage unit 140 or the coefficient storage unit 150 illustrated in FIG. 1. The elements of the processor 300*a* may communicate with one another through a system bus.

The display device 470 may display multimedia loaded to the memories 360 and 430 according to the control of the CPU 310 or the GPU 325. The display device 470 is an LCD device in a present exemplary embodiment, but the inventive concept is not restricted thereto. In other embodiments, the display device 470 may be a light emitting diode (LED) display device, an organic LED (OLED) display device, or another type of display device. The display controller 330 controls the operations of the display device 470.

Figure 8B:
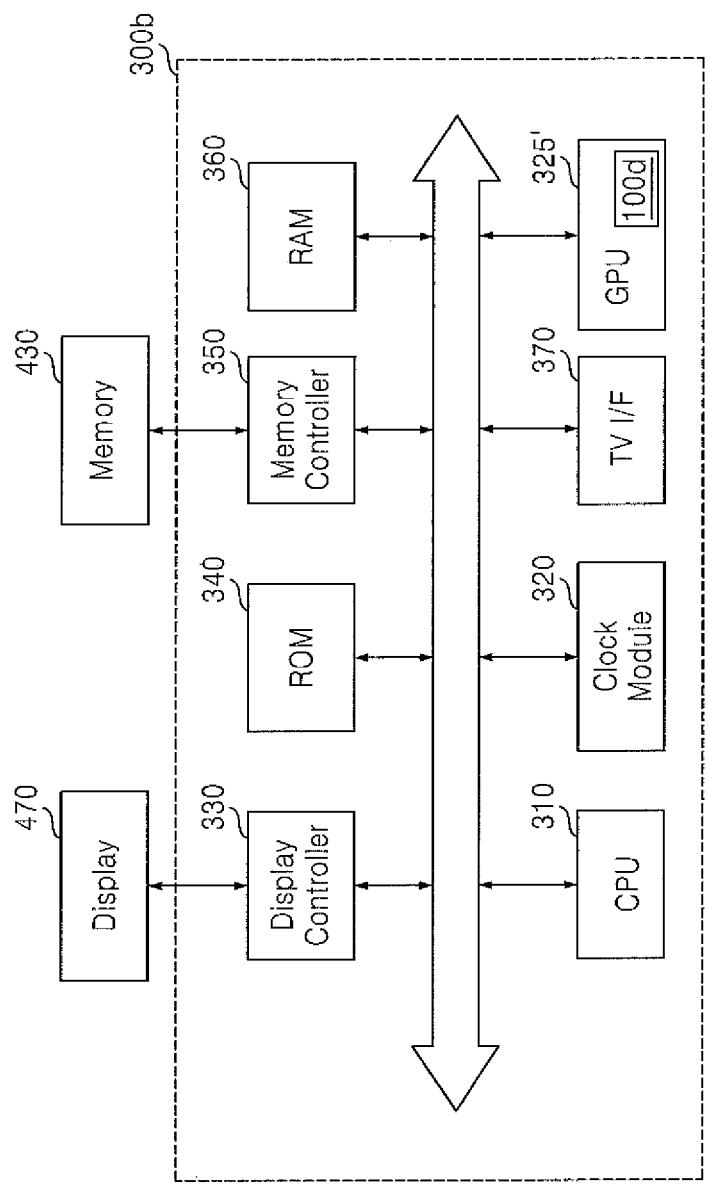
FIG. 8B is a block diagram of a example of the processor illustrated in FIG. 6 according to an exemplary embodiment of the inventive concept.

FIG. 8B is a block diagram of an example 300*b* of the processor 300 illustrated in FIG. 6. The processor 300*b* illustrated in FIG. 8B is similar to the processor 300*a* illustrated in FIG. 8A, and therefore, the differences therebetween will be mainly described.

While the scaler 100*c* is implemented in the processor 300*a* in the embodiment illustrated in FIG. 8A, a scaler 100*d* is implemented in a GPU 325' in the processor 300*b* in the embodiment illustrated in FIG. 8B.

As described above, an image processing device according to an exemplary embodiment of the inventive concept may be applied to various image processing modules (e.g., a scaler, an interpolator, a color enhancer, and a sharpness/blur enhancer). It may be implemented alone in a separate chip, module, or unit. Alternatively, it may be integrated into a chip, module, or unit together with other elements.

Figure 9:
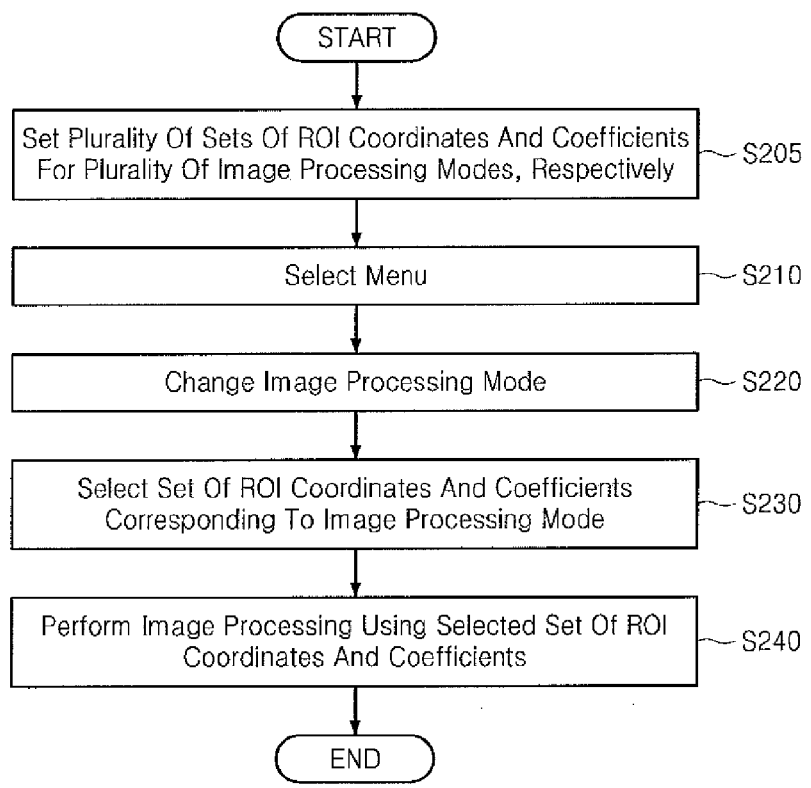
FIG. 9 is a flowchart of an image processing method according to an exemplary embodiment of the inventive concept.

FIG. 9 is a flowchart of an image processing method according to an exemplary embodiment of the inventive concept. As an example, the image processing method illustrated in FIG. 9 may be performed by the electronic system (e.g., a smart phone) 400*a* illustrated in FIG. 6.

A set of ROI coordinates and coefficients is set for each of a plurality of image processing modes (S205). The electronic system 400*a* may operate in one of the image processing modes. For instance, it is assumed that a screen is divided into two ROIs in a first image processing mode and the screen is divided into three ROIs in a second image processing modes. In this case, a separate set of ROI coordinates and coefficients is necessary for each of the image processing modes. In other words, a set of ROI coordinates and coefficients as shown in FIGS. 3A and 3B may be set for each of the image processing modes. For example, a first set of three ROI coordinates and coefficients is stored for the first processing mode and a second set of two ROI coordinates and coefficients is stored for the second processing mode.

A particular menu is selected by a user of the electronic system 400a (S210). For instance, a video player, a TV, or an Internet browser may be selected.

One of the image processing modes may be selected or a current image processing mode may be changed according to the selected menu (S220). For instance, the first image processing mode may be selected when at least one menu is selected. In another instance, the first image processing mode may be changed into the second image processing mode when at least one menu is selected in the first image processing mode. Thereafter, a set of ROI coordinates and coefficients corresponding to the selected or changed image processing mode is selected (S230). Image processing is performed using the selected set of ROI coordinates and coefficients (S240). The operation S240 may include the operations S110 through S150 in FIG. 5

At least one embodiment of the inventive concept can be embodied as computer-readable codes having computer executable instructions on a computer-readable medium. For example, the operations of FIG. 5 and the operations of FIG. 9 may be embodied as computer executable instructions. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion.

As described above, according to at least one embodiment of the inventive concept, a different coefficient is used for each of at least two images during image processing when the at least two images are displayed on a single screen, thereby enhancing image quality.

While the inventive concept has been particularly shown and described with reference to exemplary embodiments thereof, it will be understood that various changes in forms and details may be made therein without departing from the spirit and scope of the inventive concept.

What is claimed is:

1. An image processing device comprising:
a processor configured to receive input image data, determine a region which the input image data belongs to among a plurality of regions, select a coefficient among a plurality of different coefficients that corresponds to the determined region, and perform an operation on the input image data using the selected coefficient,
wherein the operation performed by the processor enhances color of the input image data when the selected coefficient indicates color enhancement is to be performed.

2. The image processing device of claim 1, wherein the processor is further configured to generate input image coordinates from the input image data, and determines the region by comparing the input image coordinates with predetermined region coordinates.

3. The image processing device of claim 2, wherein the region coordinates define the plurality of regions and the plurality of coefficients have different values, respectively, and correspond to the plurality of regions, respectively.

4. The image processing device of claim 2, further comprising: a memory configured to store the region coordinates and the plurality of coefficients.

5. The image processing device of claim 2, wherein the region coordinates and the plurality of coefficients are set by a user.

6. The image processing device of claim 1, wherein the operation performed by the processor changes a size of the input image data when the selected coefficient indicates image scaling is to be performed.

7. The image processing device of claim 1,
wherein the operation performed by the processor performs an interpolation on the input image data when the selected coefficient indicates an interpolation is to be performed,
wherein the operation performed by the processor enhances a sharpness property of the input image data when the selected coefficient indicates a sharpening is to be performed.

8. An image processing method comprising:
setting region coordinates defining a plurality of regions on a display and a plurality of coefficients respectively corresponding to the plurality of regions;
determining which one of the regions input image data belongs to;
determining which one of the coefficients corresponds to the determined one region; and
performing an operation on the input image data using the determined one coefficient,
wherein the performing the operation comprises enhancing a sharpness of the input image when the determined one coefficient indicates a sharpening is to be performed.

9. The image processing method of claim 8, wherein determining which one of the regions comprises:
generating input image coordinates from the input image data; and
comparing the input image coordinates with the region coordinates to determine the one region.

10. The image processing method of claim 9, wherein the plurality of coefficients have different values, respectively, and correspond to the plurality of regions, respectively.

11. The image processing method of claim 8, wherein the performing the operation comprises changing a size of the input image data using when the determined one coefficient indicates image scaling is to be performed.

12. The image processing method of claim 8,
wherein the performing the operation comprises performing an interpolation on the input image data when the determined one coefficient indicates an interpolation is to be performed,
wherein the performing the operation comprises enhancing color of the input image data when the determined one coefficient indicates color enhancement is to be performed.

13. An image processing method comprising:
setting a plurality of sets of region coordinates and coefficients for a plurality of image processing modes, respectively;
selecting one of the plurality of image processing modes according to a user's menu selection;
selecting a set of region coordinates and coefficients corresponding to the selected image processing mode among the plurality of sets where the set of region coordinates and coefficients comprises a plurality of coefficients respectively corresponding to a plurality of regions;

determining which one of the regions input image data belongs to; and performing an operation on the input image data using a coefficient corresponding to the determined one region among the plurality of coefficients in the selected set of region coordinates and coefficients, wherein the performing the operation comprises enhancing color of the input image data when the coefficient corresponding to the determined one region indicates color enhancement is to be performed.

14. The image processing method of claim 13, wherein determining which one of the regions comprises:

generating input image coordinates of the input image data; and comparing the input image coordinates with the region coordinates to determine the one region.

15. The image processing method of claim 13, wherein the region coordinates define the plurality of regions; and the plurality of coefficients have different values, respectively, and correspond to the plurality of regions, respectively.

16. A method of managing display of images on a display comprising first and second distinct regions, the method comprising:

determining a coordinate from input image data;

determining whether the coordinate is located within first boundary coordinates or second boundary coordinates, wherein the first boundary coordinates are associated with a first coefficient and the first region, and the second boundary coordinates are associated with a second coefficient and the second region;

selecting the first coefficient and the first region when the coordinate is determined to be located within the first boundary coordinates and otherwise selecting the second coefficient and the second region;

performing an image operation on the input image data using the selected coefficient; and outputting a result of the operation to the selected region of the display, wherein the coefficients differ from one another and a first subset of the coefficients represent different color enhancement techniques, and the image operation enhances color of the input image according to the color enhancement technique represented by the selected coefficient when the selected coefficient is among the first subset.

17. The method of claim 16, wherein a second subset of the coefficients represent different resolutions, and the image operation performs a scaling operation to scale the input image according to the resolution represented by the selected coefficient when the selected coefficient is among the second subset.

18. The method of claim 16, wherein a second subset of the coefficients represent different sharpnesses, and the image operation modifies the input image according to the sharpness represented by the selected coefficient when the selected coefficient is among the second subset.

19. The method of claim 16, wherein a second subset of the coefficients represent different image interpolation techniques, and the image operation performs interpolation on the input image according to the interpolation technique represented by the selected coefficient when the selected coefficient is among the second subset.

* * * * *